United States Patent
Cheong et al.

(10) Patent No.: US 8,896,173 B2
(45) Date of Patent: Nov. 25, 2014

(54) SPINDLE MOTOR HAVING RECEPTION PART IN ROTOR HUB

(75) Inventors: Shin Young Cheong, Gyunggi-do (KR); Chang Jo Yu, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 455 days.

(21) Appl. No.: 13/396,086

(22) Filed: Feb. 14, 2012

(65) Prior Publication Data

US 2013/0099613 A1   Apr. 25, 2013

(30) Foreign Application Priority Data

Oct. 21, 2011   (KR) .................. 10-2011-0108012

(51) Int. Cl.
*H02K 7/08* (2006.01)
*F16C 33/74* (2006.01)
*H02K 5/167* (2006.01)
*G11B 19/20* (2006.01)

(52) U.S. Cl.
CPC ............ *F16C 33/743* (2013.01); *H02K 5/1677* (2013.01); *G11B 19/2009* (2013.01); *G16C 33/1065* (2013.01); *F16C 33/745* (2013.01)
USPC ....... 310/90; 360/99.08; 360/99.12; 384/107; 384/121

(58) Field of Classification Search
CPC .... H02K 5/1677; H02K 7/086; F16C 33/107; F16C 33/1065; G11B 19/2009; G11B 19/2018
USPC ........ 310/90; 360/99.08, 99.12; 384/107, 121
IPC ........................................................ H02K 7/08
See application file for complete search history.

(56) References Cited

U.S. PATENT DOCUMENTS

| | | | |
|---|---|---|---|
| 8,582,233 B2 * | 11/2013 | Fukushima | 360/99.08 |
| 2005/0249440 A1 * | 11/2005 | Yokoo | 384/100 |
| 2006/0147135 A1 | 7/2006 | Kim | |
| 2008/0063332 A1 | 3/2008 | Yamamoto et al. | |
| 2008/0068744 A1 * | 3/2008 | Nakazawa et al. | 360/97.01 |
| 2008/0298731 A1 * | 12/2008 | Hino et al. | 384/107 |
| 2009/0028474 A1 * | 1/2009 | Asada et al. | 384/112 |
| 2009/0133244 A1 * | 5/2009 | Iguchi et al. | 29/596 |
| 2012/0050913 A1 * | 3/2012 | Jang et al. | 360/99.12 |
| 2013/0099613 A1 * | 4/2013 | Cheong et al. | 310/90 |
| 2013/0194701 A1 * | 8/2013 | Fukushima | 360/99.08 |
| 2014/0125175 A1 * | 5/2014 | Cheong et al. | 310/90 |

FOREIGN PATENT DOCUMENTS

| | | |
|---|---|---|
| JP | 2003-199287 | 7/2003 |
| JP | 2004-104982 | 4/2004 |
| JP | 2004-132455 | 4/2004 |
| JP | 2009-8200 | 1/2009 |
| KR | 10-2006-0079630 | 7/2006 |

OTHER PUBLICATIONS

Korean Office Action issued Aug. 19, 2014 in corresponding Korean Patent Application No. 10-2011-0108012.

* cited by examiner

*Primary Examiner* — John K Kim (57) ABSTRACT

There is provided a spindle motor including: upper and lower thrust parts fixedly installed on a shaft; a reception part formed in the rotor hub to thereby receive an end portion of the upper thrust part and form an oil interface together with the upper thrust part; and a clamp fixing part inserted into the reception part while having a clearance with the upper thrust part, and guiding a position of a clamp for fixing the recording medium.

9 Claims, 7 Drawing Sheets

SPINDLE MOTOR HAVING RECEPTION PART IN ROTOR HUB

CROSS-REFERENCE TO RELATED APPLICATIONS

This application claims the priority of Korean Patent Application No. 10-2011-0108012 filed on Oct. 21, 2011 in the Korean Intellectual Property Office, the disclosure of which is incorporated herein by reference.

BACKGROUND OF THE INVENTION

1. Field of the Invention

The present invention relates to a spindle motor, and more particularly, to a motor capable of being used in a recording disk driving device for a server rotating a recording disk.

2. Description of the Related Art

A recording disk driving device for a server generally has a fixed-shaft type spindle motor, in which a shaft having strong impact resistance is fixed to a box of the recording disk driving device, mounted therein.

That is, the shaft is fixedly installed in the spindle motor mounted in the recording disk driving device for a server in order to prevent information recorded in the server from being damaged and being unwritable or unreadable, due to an external impact.

In the case in which the fixed type shaft is installed as described above, a base and a shaft, fixed members, a cover for shielding the fixed members, and a sleeve and a hub, rotating members, are generally required in order to stabilize a fluid dynamic bearing assembly via dynamic oil pressure.

In other words, in order to configure the fluid dynamic bearing assembly including the fixed type shaft, many components are required. Therefore, time required for manufacturing the spindle motor may be necessarily increased, and the overall tolerance of the spindle motor may be increased due to the tolerances of many components.

Therefore, research into a technology for reducing the number of components required for a fluid dynamic bearing assembly, so as to improve productivity and significantly reduce a manufacturing tolerance, thereby improving rotation characteristics, has been urgently demanded.

SUMMARY OF THE INVENTION

An aspect of the present invention provides a spindle motor in which the number of components is reduced to improve productivity, significantly reduce manufacturing tolerance, and allow oil to be injected thereinto.

According to an aspect of the present invention, there is provided a spindle motor including: a shaft directly or indirectly fixed to a base; a rotor hub installed to be rotatable via oil, while having a bearing clearance with the shaft, and including a recording medium mounted thereon; upper and lower thrust parts fixedly installed on the shaft; a reception part formed in the rotor hub to thereby receive an end portion of the upper thrust part and form an oil interface together with the upper thrust part; and a clamp fixing part inserted into the reception part while having a clearance with the upper thrust part, and guiding a position of a clamp for fixing the recording medium.

One surface of the reception part forming the oil interface, together with the upper thrust part, may be inclined downwardly in an inner diameter direction.

The upper thrust part may include a coupling part coupled to the shaft in a state in which it is disposed on an upper surface of the rotor hub and an extension part extended from the coupling part toward the reception part to thereby form the oil interface together with one surface of the reception part.

The clamp fixing part may include a protrusion part facing the upper thrust part and guiding an insertion of the clamp and a fixing part extended from the protrusion part to thereby be coupled to a lower surface and an outer side surface of the reception part.

An upper surface of the protrusion part may protrude upwardly in an axial direction, to be higher than that with regard to an upper surface of the fixing part.

A clearance between the upper thrust part and the clamp fixing part facing the upper thrust part may be in the range of above 0 mm to 0.5 mm or less.

The upper thrust part, the reception part, and the clamp fixing part may be formed continuously in a circumferential direction.

The shaft may include a separation groove depressed from an outer peripheral surface thereof so as to separate the oil upwardly and downwardly in an axial direction, the oil filling the clearance formed by the rotor hub and the shaft.

The rotor hub may include a communication hole disposed to face the separation groove to thereby allow the separation groove and the outside of the rotor hub to be in communication with each other, and each of upper and lower portions of the communication hole in the axial direction may be provided with the oil interface.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are construed as being included in the spirit of the present invention.

Further, like reference numerals will be used to designate like components having similar functions throughout the drawings within the scope of the present invention.

Figure 1:
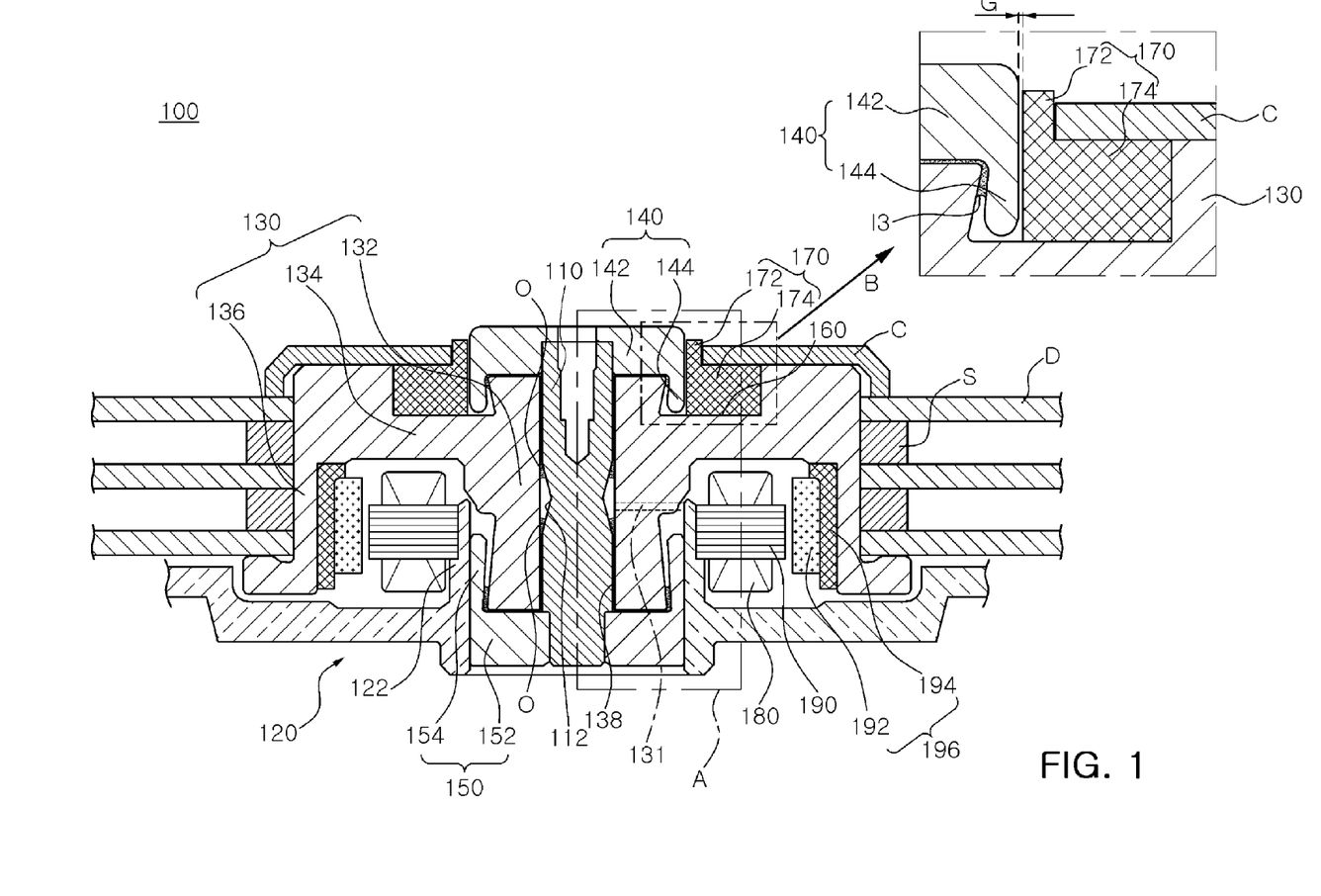
FIG. 1 is a schematic cross-sectional view showing a spindle motor according to an embodiment of the present invention.
Figure 2:
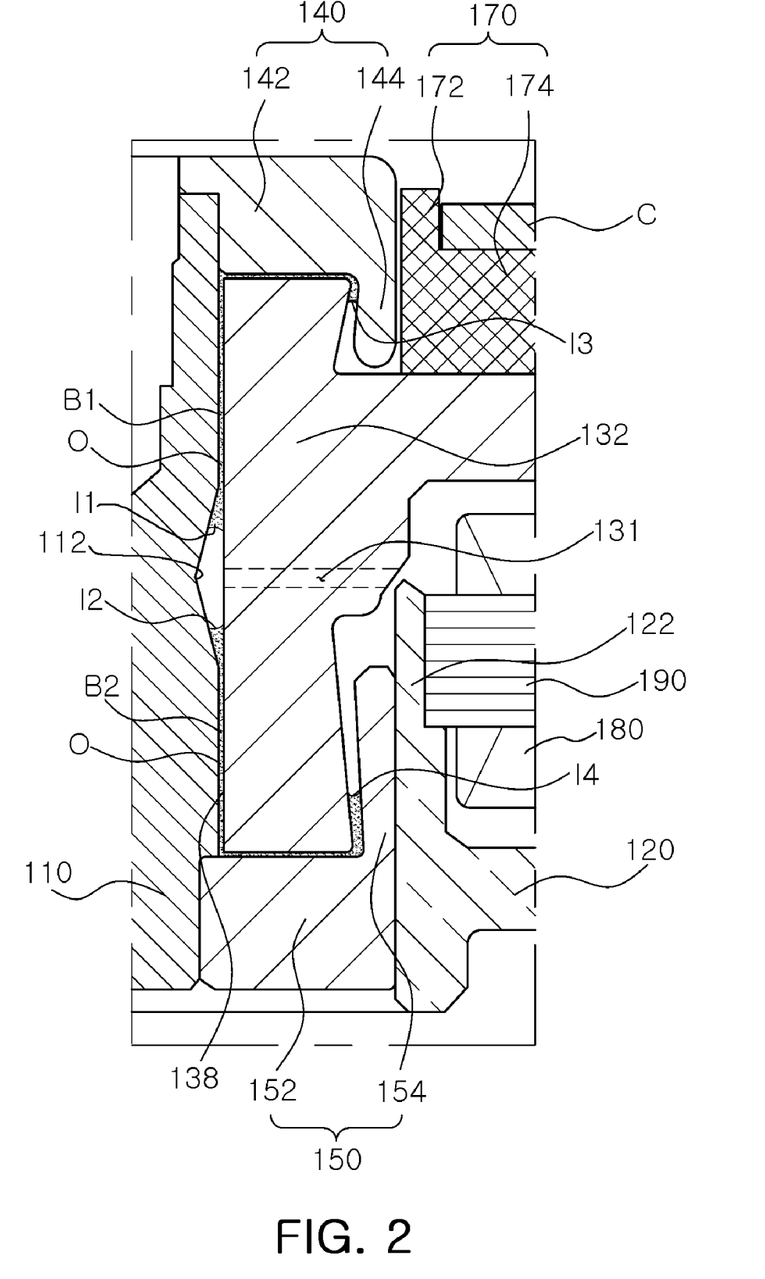
FIG. 2 is a schematic enlarged cross-sectional view of part A of FIG. 1.

FIG. 1 is a schematic cross-sectional view showing a spindle motor according to an embodiment of the present invention; and FIG. 2 is a schematic enlarged cross-sectional view of part A of FIG. 1.

Figure 3:
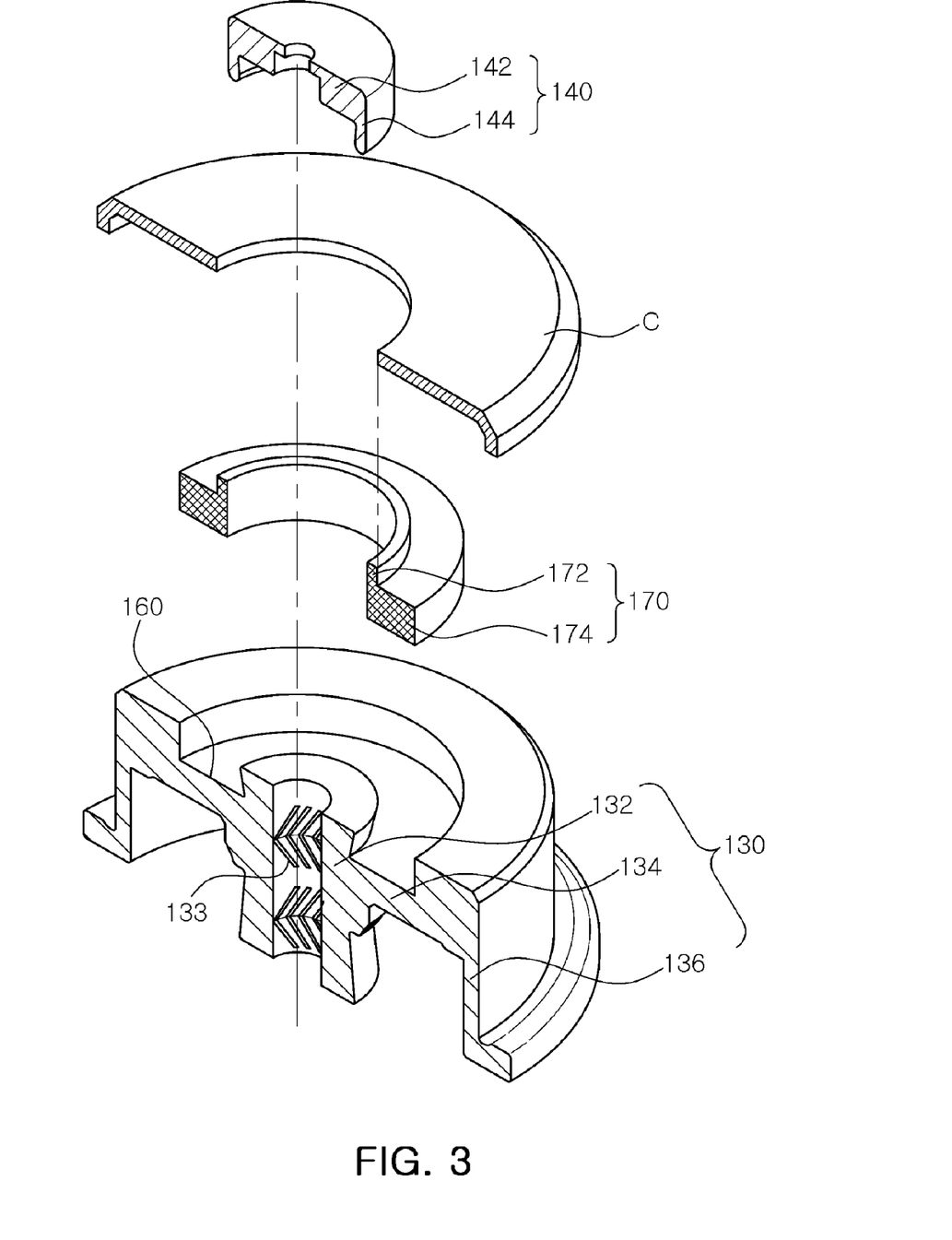
FIG. 3 is a schematic exploded cut-away perspective view showing main components of the spindle motor according to the embodiment of the present invention.

FIG. 3 is a schematic exploded cut-away perspective view showing main components of the spindle motor according to the embodiment of the present invention.

Referring to FIGS. 1 through 3, the spindle motor 100 according to the embodiment of the present invention may include a shaft 110 fixed to a base 120 provided as a fixed member, a rotor hub 130 provided as a rotating member, upper and lower thrust parts 140 and 150, and a clamp fixing part 170 inserted into a reception part 160 formed in the rotor hub 130.

Terms with respect to directions will be first defined. As viewed in FIG. 1, an axial direction refers to a vertical direction based on the shaft 110, and an outer diameter or inner diameter direction refers to a direction towards an outer edge of the rotor hub 130 based on the shaft 110 or a direction towards the center of the shaft 110 based on the outer edge of the rotor hub 130.

In addition, a circumferential direction refers to a rotation direction of the rotor hub 130, that is, a direction corresponding to an outer peripheral surface of the rotor hub 130.

The base 120 may be a fixed member supporting rotation of a rotating member including the rotor hub 130 with respect to the rotating member.

Here, the base 120 may form a predetermined space together with the rotor hub 130, and a core 190 having a coil 180 wound therearound may be disposed in the space.

That is, the base 120 may include a core coupling part 122 extended upwardly in the axial direction, and the core 190 having the coil 180 wound therearound may be inserted into and fixedly installed on an outer peripheral surface of the core coupling part 122.

The shaft 110 may be indirectly fixedly installed on the base 120 via the lower thrust part 150 and configure the fixed member together with the upper and lower thrust parts 140 and 150.

Here, the shaft 110 may be inserted into and fixed to a hole formed in a disk part 152 of the lower thrust part 150 and be fixedly installed by at least one of a press-fitting method, a welding method, and a bonding method.

In addition, the shaft 110 may include a separation groove 112 depressed from an outer peripheral surface thereof to thereby separate oil O filling a clearance between the shaft 110 and the rotor hub 130 upwardly and downwardly in the axial direction.

The separation groove 112 may have an inclined "V" shaped cross section in the axial direction and allow interfaces I1 and I2 of the oil O to be formed together with an inner peripheral surface of the rotor hub 130.

A detailed description thereof will be provided below.

Additionally, although FIG. 1 shows that the shaft 110 is fixedly installed to the lower thrust part 150 to thereby indirectly be fixed to the base 120, the present invention is not limited thereto. That is, the shaft 110 may also be directly fixedly installed on the base 120.

The rotor hub 130 may be installed to be rotatable via the oil O, having a clearance with the shaft 110 described above, and include a recording medium mounted thereon.

That is, the rotor hub 130 provided in the spindle motor 100 according to the embodiment of the present invention may have both of a function of the sleeve according to the related art and a function of the hub according to the related art, and may include a through-hole 138 having the shaft 110 inserted thereinto so as to be rotatably installed on the shaft 110.

Therefore, according to the embodiment of the present invention, the sleeve according to the related art and the hub according to the related art may be replaced with a single component, that is, the rotor hub 130, such that the number of components is reduced, whereby productivity may be improved and a manufacturing tolerance may be significantly reduced.

In addition, since repeatable run out (RRO) may be reduced by the rotor hub 130 in which the sleeve according to the related art and the hub according to the related art are integrated with each other, micro vibration may be significantly reduced, whereby performance may be significantly improved.

More specifically, the rotor hub 130 may include a body part 132 maintaining a clearance with the shaft 110 and forming bearing clearances B1 and B2 with the shaft 110, a space forming part 134 extended from the body part 132 in the outer diameter direction and having a reception part 160 to be described below formed therein, and a magnet supporting part 136.

In a case in which the rotor hub 130 is rotatably installed on the shaft 110, a clearance between an inner peripheral surface of the rotor hub 130, that is, an inner peripheral surface of the body part 132 and an outer peripheral surface of the shaft 110 may be the bearing clearances B1 and B2 forming a fluid dynamic bearing.

Here, the bearing clearances B1 and B2 will be described in more detail. The bearing clearances B1 and B2 may be provided as an upper bearing clearance B1 and a lower bearing clearance B2.

The upper and lower bearing clearances B1 and B2 may be formed at an upper portion and a lower portion in the axial direction, respectively, based on the separation groove 112 formed in the shaft 110, and the upper portion of the separation groove 112 may be provided with a first oil interface I1, which is an interface between the oil O filling the upper bearing clearance B1 and air.

In addition, the lower portion of the separation groove 112 may be provided with a second oil interface I2, which is an interface between the oil O filling the lower bearing clearance B2 and air.

The separation groove 112 may have the inclined "V" shape as described above, which is to prevent leakage of the oil by a capillary phenomenon.

Here, in order to form the first and second oil interfaces I1 and I2, the oil O filling the upper and lower bearing clearances B1 and B2 needs to contact the air.

Therefore, the body part 132 of the rotor hub 130 may include a communication hole 131 formed therein in order to allow the separation groove 112 to be in communication with the outside.

That is, the separation groove 112 and the outside of the rotor hub 130 may have the same pressure due to the communication hole 131.

Here, the communication hole 131 may be formed horizontally in a radial direction as shown in FIGS. 1 and 2 but is not limited thereto. That is, the communication hole 131 may also be inclined upwardly or downwardly in the outer diameter direction.

Meanwhile, a fluid dynamic part 133 may be formed in at least one of the inner peripheral surface of the body part 132 of the rotor hub 130 and the outer peripheral surface of the shaft 110, and may generate radial dynamic pressure via the oil O.

That is, a groove having a herringbone shape, a spiral shape, or a screw shape may be formed in at least one of the inner peripheral surface of the body part 132 of the rotor hub 130 and the outer peripheral surface of the shaft 110, which configure the upper and lower bearing clearances B1 and B2 described above, to thereby generate radial dynamic pressure supporting rotation of the rotor hub 130 via the oil O.

In addition, the space forming part 134 of the rotor hub 130 may be extended from the body part 132 in the outer diameter direction and form, together with the base 120, a space in which the core 190 having the coil 180 wound therearound is disposed.

Further, an upper surface of the space forming part 134 may be provided with the reception part 160 formed therein, receiving an end portion of an upper thrust part 140 to be described below and a clamp fixing part 170 inserted thereinto.

A description thereof will be provided after a description of the upper and lower thrust parts 140 and 150.

The rotor hub 130 may include the magnet support part 136 continuously formed with the space forming part 134 and extended downwardly from the space forming part 134 in the axial direction, wherein the magnet support part 136 may include a magnet assembly 196 coupled thereto.

That is, the magnet support part 136 may include the magnet assembly 196 coupled to an inner peripheral surface thereof and disks D insertedly disposed on an outer peripheral surface thereof, wherein the disks D are spaced apart from each other by a spacer S.

Meanwhile, the magnet assembly 196 may include a yoke 194 fixedly installed on the inner peripheral surface of the magnet support part 136 and a magnet 192 installed on an inner peripheral surface of the yoke 194.

The yoke 194 may serve to allow a magnetic field from the magnet 192 to be directed toward the core 190 having the coil 180 wound therearound to thereby increase magnetic flux density.

Meanwhile, the yoke 194 may have a circular ring shape and have a shape in which an end portion thereof is bent so as to increase the magnetic flux density by the magnetic field generated from the magnet 192.

Here, the magnet 192 may have an annular ring shape and be a permanent magnet generating a magnetic field having a predetermined strength by alternately magnetizing an N pole and an S pole in a circumferential direction.

Meanwhile, the magnet 192 may be disposed to face a front end of the core 190 having the coil 108 wound therearound and generate driving force by electromagnetic interaction with the core 190 having the coil 180 wound therearound so that the rotor hub 130 may rotate.

That is, when power is supplied to the coil 180, the driving force rotating the rotor hub 130 is generated by the electromagnetic interaction between the core 190 having the coil 180 wound therearound and the magnet 192 disposed to face the core 190, such that the rotor hub 130 may rotate based on the shaft 110.

The upper and lower thrust parts 140 and 150 may form the oil interface O together with the body part 132 of the rotor hub 130 and be coupled to the shaft 110 to thereby configure the fixed member together with the shaft 110.

The lower thrust part 150 will be first described before the upper lower thrust part 140 is described.

The lower thrust part 150 may be inserted into and fixed to the base 120. More specifically, an outer peripheral surface of the lower thrust part 150 may be installed to be bonded to an inner peripheral surface of the core coupling part 122 of the base 120.

Meanwhile, an inner peripheral surface of the low thrust part 150 may be fixedly installed to a lower end portion of the shaft 110. More specifically, the lower thrust part 150 may include a disk part 152 coupled to the shaft 110 and a wall part 154 extended upwardly from the disk part 152 in the axial direction.

That is, the lower thrust part 150 may have a cup shape having a hollow, have a "L" shaped cross section in the axial direction, and be formed continuously in the circumferential direction.

Meanwhile, the outer peripheral surface of the lower thrust part 150 may be coupled to the inner peripheral surface of the core coupling part 122 of the base 120 by at least one of a welding method, a bonding method, and a press-fitting method.

In addition, a thrust dynamic part (not shown) for generating thrust dynamic pressure may be formed in at least one of an upper surface of the lower thrust part 150 and a lower surface of the body part 132 of the rotor hub 130.

Here, an interface between the oil O and the air, that is, a fourth oil interface I4 may be formed between an inner peripheral surface of the wall part 154 of the lower thrust part 150 and an outer peripheral surface of the body part 132 of the rotor hub 130.

More specifically, the outer peripheral surface of the body part 132 of the rotor hub 130 facing the wall part 154 may be inclined upwardly in the inner diameter direction in order to form the fourth oil interface I4.

Therefore, the oil O filling the lower bearing clearance B2 forms the second and fourth oil interfaces I2 and I4.

The upper thrust part 140 may be coupled to an upper end portion of the shaft 110. More specifically, the upper thrust part may include a coupling part 142 coupled to the shaft 110 in a state in which it is disposed on an upper surface of the body part 132 of the rotor hub 130 and an extension part 144 extended downwardly from the coupling part 142 in the axial direction.

That is, the upper thrust part 140 may have a '⊓' shaped cross section in the axial direction and be formed continuously in the circumferential direction.

Meanwhile, the upper thrust part 140 may be coupled to the shaft 110 by at least one of a welding method, a bonding method, and a press-fitting method.

In addition, a thrust dynamic part (not shown) for generating thrust dynamic pressure may be formed in at least one of a lower surface of the coupling part 142 of the upper thrust part 140 and an upper surface of the body part 132 of the rotor hub 130.

Here, an interface between the oil O and the air, that is, a third oil interface I3 may be formed between an inner peripheral surface of the extension part 144 of the upper thrust part 140 and the outer peripheral surface of the body part 132 of the rotor hub 130.

Therefore, the oil O filling the upper bearing clearance B1 may form the first and third oil interfaces I1 and I3.

More specifically, the outer peripheral surface of the body part 132 of the rotor hub 130 facing the extension part 144 may be inclined downwardly in the inner diameter direction in order to form the third oil interface I3.

This is to reduce scattering of the oil O due to centrifugal force at the time of rotation of the rotor hub 130, which will be described with reference to FIG. 4.

Meanwhile, the extension part 144 including an end portion of the upper thrust part 140 may be received in the reception part 160 formed in the rotor hub 130, and the third oil interface I3 described above may be formed between the extension part 144 and an inner side surface of the reception part 160.

Here, the reception part 160 may provide a space for filling the upper bearing clearance B1 with the oil O, which will be described with reference to FIGS. 5A through 5C.

Meanwhile, the outer peripheral surface of the body part 132 of the rotor hub 130 forming the third oil interface I3 may be the same as the inner side surface of the reception part 160, and the inner side surface of the reception part 160 may be inclined downwardly in the inner diameter direction.

Here, the reception part 160 may be formed continuously in the circumferential direction.

In addition, the clamp fixing part 170 guiding a position of a clamp C for fixing the recording medium may be inserted, together with the extension part 144 of the upper thrust part 140, into the reception part 160.

The clamp fixing part 170, a component for fixing the clamp C, may include a protrusion part 172 facing the upper thrust part 140 and guiding an insertion of the clamp C and a fixing part 174 extended from the protrusion part 172 to thereby be coupled to a lower surface and an outer side surface of the reception part 160.

That is, in the clamp fixing part 170, an upper surface of the protrusion part 172 may protrude in the axial direction, to be higher than that with regard to an upper surface of the fixing part 174. In addition, the clamp fixing part 170 may have a "L" shaped cross section in the axial direction.

In addition, a clearance G between the upper thrust part 140 and the clamp fixing part 170 facing the upper thrust part 140 may be in the range of above 0 mm to 0.5 mm or less. More specifically, a clearance G between the extension part 144 of the upper thrust part 140 and the protrusion part 172 may be in the above-mentioned range.

Therefore, the clamp fixing part 170 may be coupled to the reception part 160 of the rotor hub 130, having a predetermined clearance with the upper thrust part 140, to thereby rotate together with the rotor hub 130.

Here, the clamp C for fixing the disk D to the rotor hub 130 may have a hollow inserted into and fixed to an outer peripheral surface of the protrusion part 172 of the clamp fixing part 170 and a lower surface fixedly installed on an upper surface of the fixing part 174 of the clamp fixing part 170.

In addition, the clamp fixing part 170 may be formed continuously in the circumferential direction.

Here, before the clamp fixing part 170 is inserted into and fixed to the reception part 160 formed in the rotor hub 130, the oil O generating the fluid dynamic pressure may be filled, which will be described with reference to FIGS. 5A through 5C.

Figure 4:
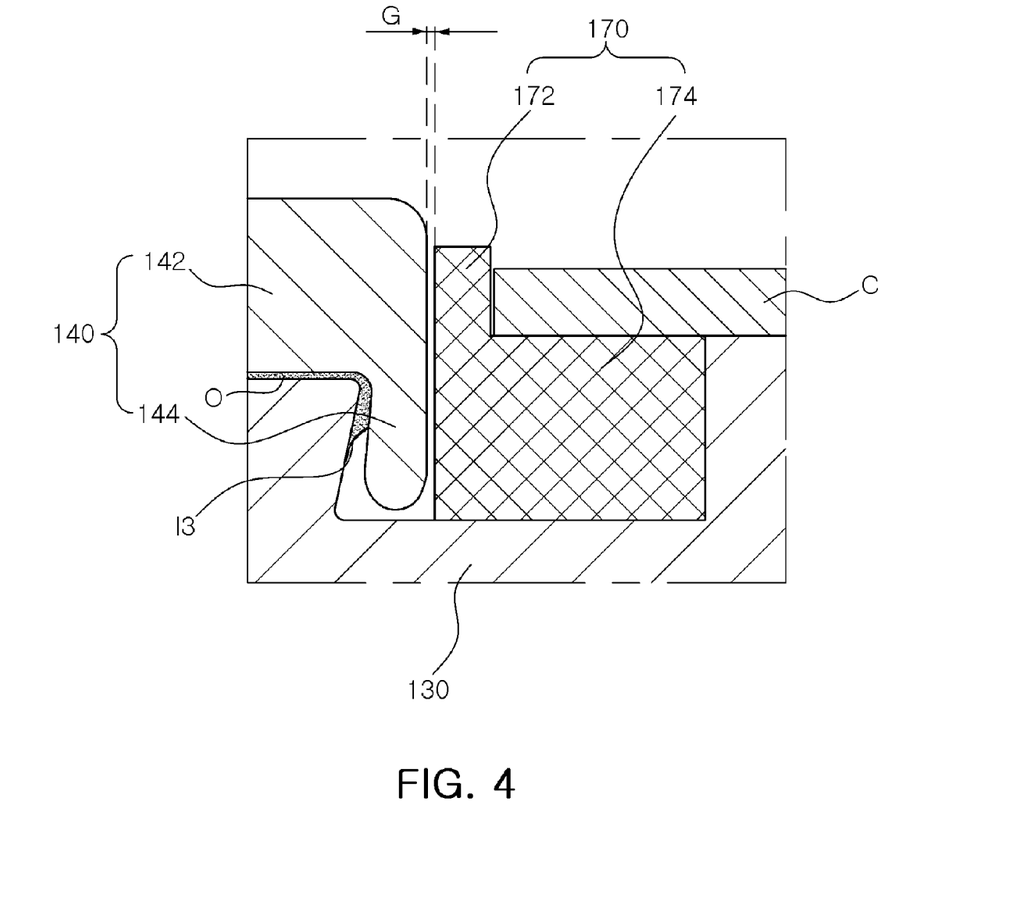
FIG. 4 is a schematic enlarged cross-sectional view of part B of FIG. 1 provided in order to describe a change in a third oil interface of the spindle motor according to the embodiment of the present invention.

FIG. 4 is a schematic enlarged cross-sectional view of part B of FIG. 1 provided in order to describe a change in a third oil interface of the spindle motor according to the embodiment of the present invention.

Referring to FIG. 4, the upper portion of the body part 132 of the rotor hub 130, that is, the inner side surface of the reception part 160 may be inclined downwardly in the inner diameter direction.

Here, the third oil interface I3 may be formed between the inner side surface of the reception part 160 and the extension part 144 of the upper thrust part 140, and the oil O may have centrifugal force applied thereto in the case in which the rotor hub 130 rotates.

That is, in the case in which the rotor hub 130 rotates, the oil O may be biased toward the inner side surface of the reception 160, whereby the scattering of the oil O may be relatively further reduced.

In addition, the clearance G between the extension part 144 of the upper thrust part 140 and the protrusion part 172 of the clamp fixing part 170 may be in the range of above 0 mm to 0.5 mm or less as described above. The above-mentioned clearance G may form a labyrinth seal.

Therefore, movement of air contained in the oil O to the outside may be suppressed due to the clearance between the extension part 144 and the protrusion part 172 forming the labyrinth seal, whereby the scattering of the oil O may be effectively reduced.

Figure 5A:
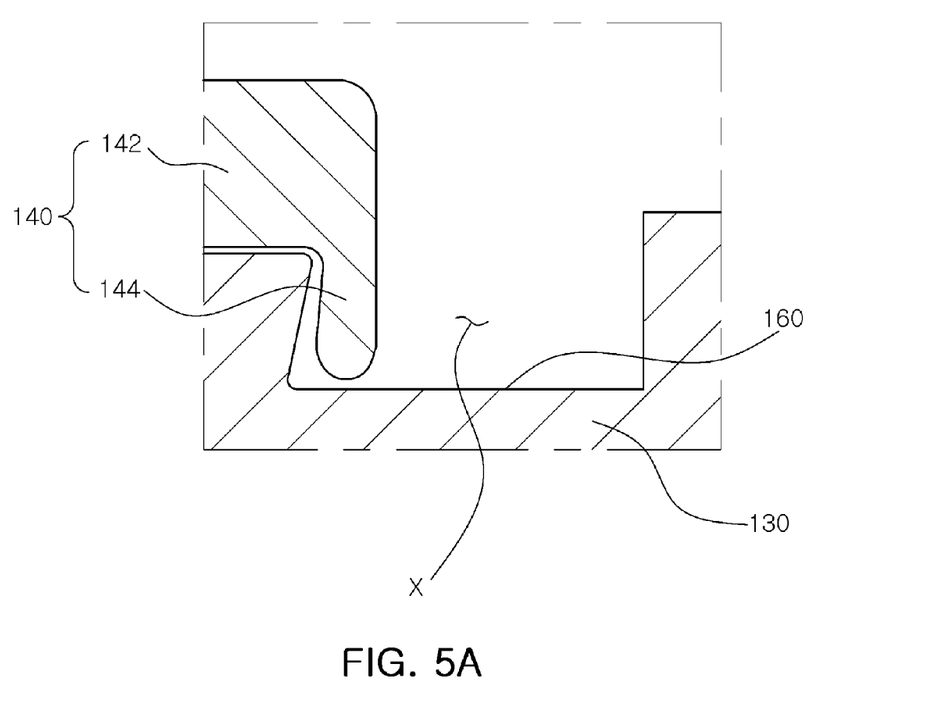
FIGS. 5A through 5C are schematic cross-sectional views (the part A of FIG. 1) showing a process of filling oil in the spindle motor according to the embodiment of the present invention.
Figure 5B:
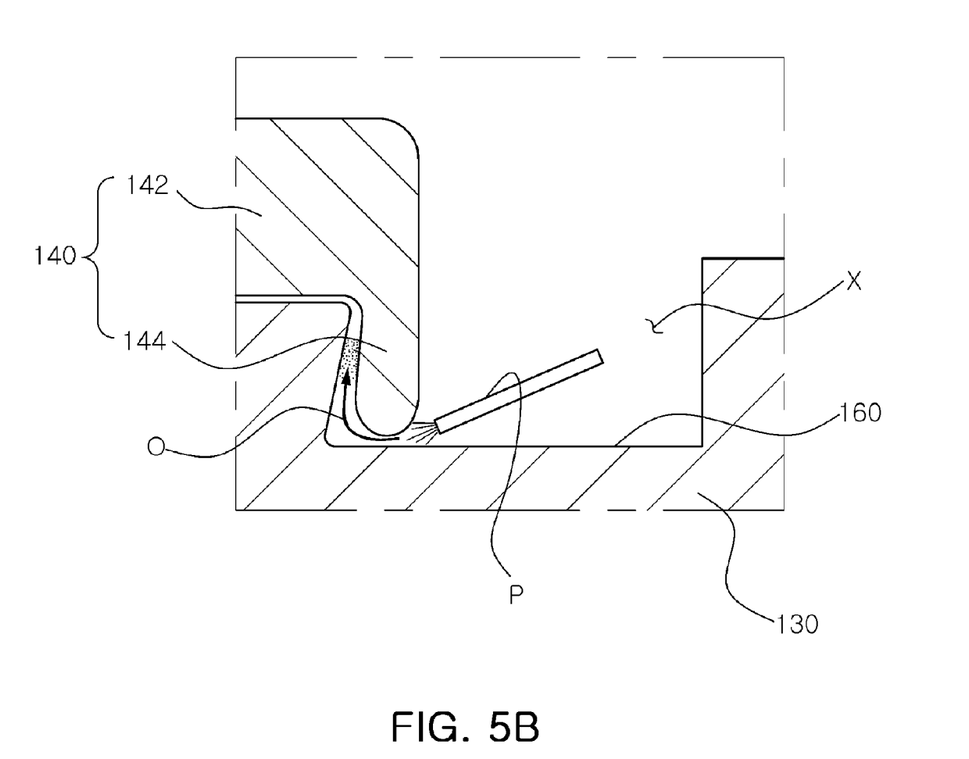
Figure 5C:
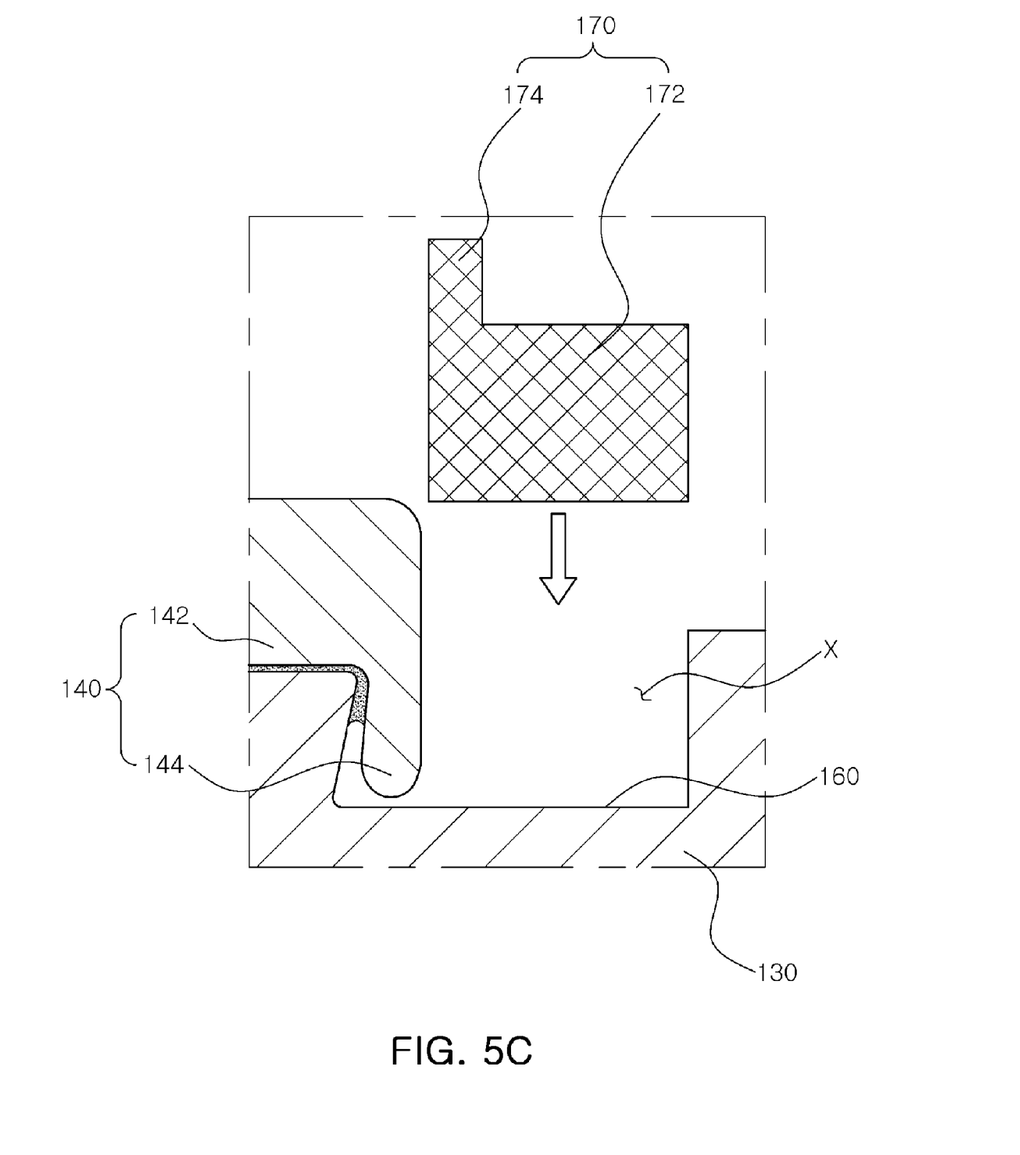

FIGS. 5A through 5C are schematic cross-sectional views (part A of FIG. 1) showing a process of filling oil in the spindle motor according to the embodiment of the present invention.

Referring to FIGS. 5A through 5C, after the upper thrust part 140 is fixed to the shaft 110 and before the clamp fixing part 170 is inserted into and fixed to the reception part 160, the outer peripheral surface of the upper thrust part 140 and the outer side surface of the reception part 160 may include a predetermined space X formed therebetween.

The space X may indicate a space for filling the oil O required in the fluid dynamic bearing of the spindle motor 100 according to the embodiment of the present invention.

In other words, the spindle motor according to the related art has a structure in which the sleeve and the hub are manufactured as separate components and then coupled to each other. Therefore, since the oil may be filled before the hub is coupled to the sleeve, a defect does not occur in filling the oil.

However, according to the embodiment of the present invention, the sleeve according to the related art and the hub according to the related are integrated with each other to thereby be implemented as the rotor hub 130, which is a single component. Therefore, when the upper thrust part 140 is coupled to the shaft 110 in a state in which it is disposed at the upper portion of the rotor hub 130, a space from which the oil O may be injected is required.

Therefore, according to the embodiment of the present invention, the reception part 160 may be formed in the rotor hub 130, whereby the space capable of filling the oil O may be provided.

That is, even in a case in which the upper thrust part 140 is coupled to the shaft 110 in a state in which it is disposed on the upper portion of the body part 132 of the rotor hub 130, the space X capable of filling the oil may be sufficiently formed between the outer peripheral surface of the extension part 144 of the upper thrust part 140 and the outer side surface of the reception part 160.

Thereafter, an oil injection device P may be inserted into the space X, whereby the oil O may stably, simply fill the bearing clearance B1.

Here, after the filling of the oil O is completed, the clamp fixing part 170 may be inserted into and fixed to the reception part 160. Therefore, the scattering of the oil O may be significantly reduced.

In addition, the clamp fixing part 170 may be inserted into and fixed to the reception part 160 so as to guide the insertion of the clamp C for fixing the disk D by including the protrusion part 172, simultaneously with preventing the scattering of the oil O.

As described above, in the spindle motor 100 according to the embodiments of the present invention 100, the sleeve according to the related art and the hub according to the related may be implemented as the rotor hub 130, which is a single component, whereby productivity may be improved and a manufacturing tolerance may be significantly reduced.

In addition, since repeatable run out (RRO) may be reduced due to a reduction in the number of components, micro vibration is significantly reduced, whereby performance may be significantly improved.

Furthermore, the reception part 160 may be formed in the rotor hub 130, whereby the oil O for generating the fluid dynamic pressure may be easily injected.

As set forth above, with the spindle motor according to the embodiments of the present invention, the number of components configuring the spindle motor may be reduced, whereby productivity may be improved and a manufacturing tolerance may be significantly reduced.

In addition, the oil for the fluid dynamic bearing may be easily injected.

Further, since the repeatable run out (RRO) may be reduced, the micro vibration is significantly reduced, whereby the performance may be significantly improved.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
   a shaft directly or indirectly fixed to a base;
   a rotor hub installed to be rotatable via oil, while having a bearing clearance with the shaft, and including a recording medium mounted thereon;
   upper and lower thrust parts fixedly installed on the shaft;
   a reception part formed in the rotor hub to thereby receive an end portion of the upper thrust part and form an oil interface together with the upper thrust part; and
   a clamp fixing part inserted into the reception part while having a clearance with the upper thrust part, and guiding a position of a clamp for fixing the recording medium.

2. The spindle motor of claim 1, wherein one surface of the reception part forming the oil interface, together with the upper thrust part, is inclined downwardly in an inner diameter direction.

3. The spindle motor of claim 2, wherein the upper thrust part includes a coupling part coupled to the shaft in a state in which it is disposed on an upper surface of the rotor hub and an extension part extended from the coupling part toward the reception part to thereby form the oil interface together with one surface of the reception part.

4. The spindle motor of claim 1, wherein the clamp fixing part includes a protrusion part facing the upper thrust part and guiding an insertion of the clamp and a fixing part extended from the protrusion part to thereby be coupled to a lower surface and an outer side surface of the reception part.

5. The spindle motor of claim 4, wherein an upper surface of the protrusion part protrudes upwardly in an axial direction, to be higher than that with regard to an upper surface of the fixing part.

6. The spindle motor of claim 1, wherein a clearance between the upper thrust part and the clamp fixing part facing the upper thrust part is in the range of above 0 mm to 0.5 mm or less.

7. The spindle motor of claim 1, wherein the upper thrust part, the reception part, and the clamp fixing part are formed continuously in a circumferential direction.

8. The spindle motor of claim 1, wherein the shaft includes a separation groove depressed from an outer peripheral surface thereof so as to separate the oil upwardly and downwardly in an axial direction, the oil filling the clearance formed by the rotor hub and the shaft.

9. The spindle motor of claim 8, wherein the rotor hub includes a communication hole disposed to face the separation groove to thereby allow the separation groove and the outside of the rotor hub to be in communication with each other, and
   each of upper and lower portions of the communication hole in the axial direction is provided with the oil interface.

* * * * *